July 16, 1929.　　　A. C. MATHER　　　1,720,846
FLYING MACHINE
Filed April 18, 1921　　7 Sheets-Sheet 3
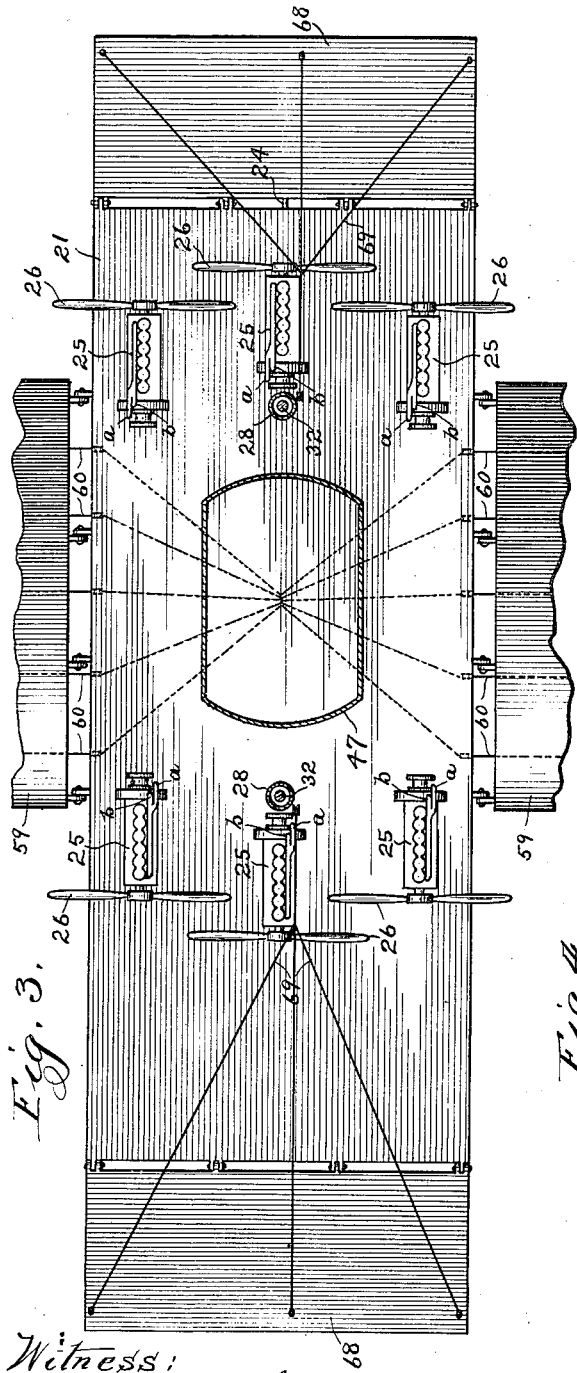
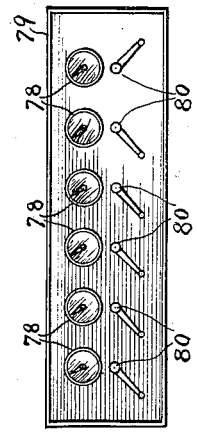
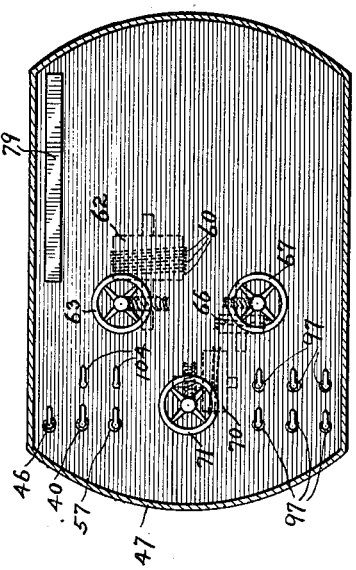

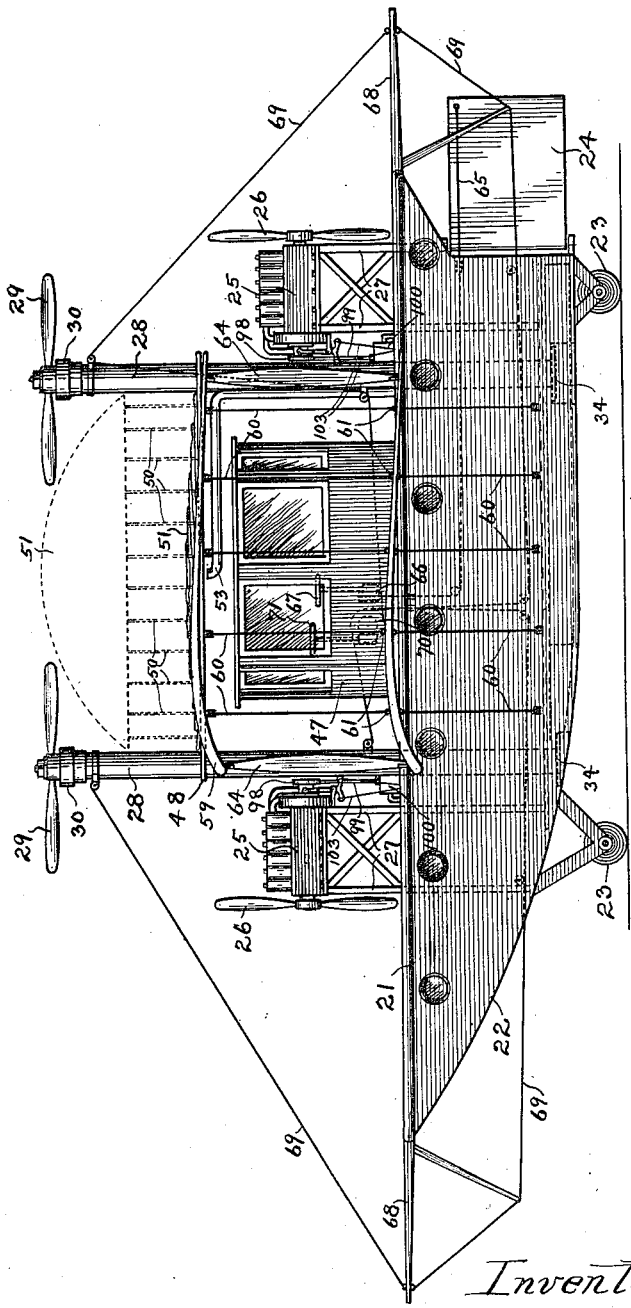

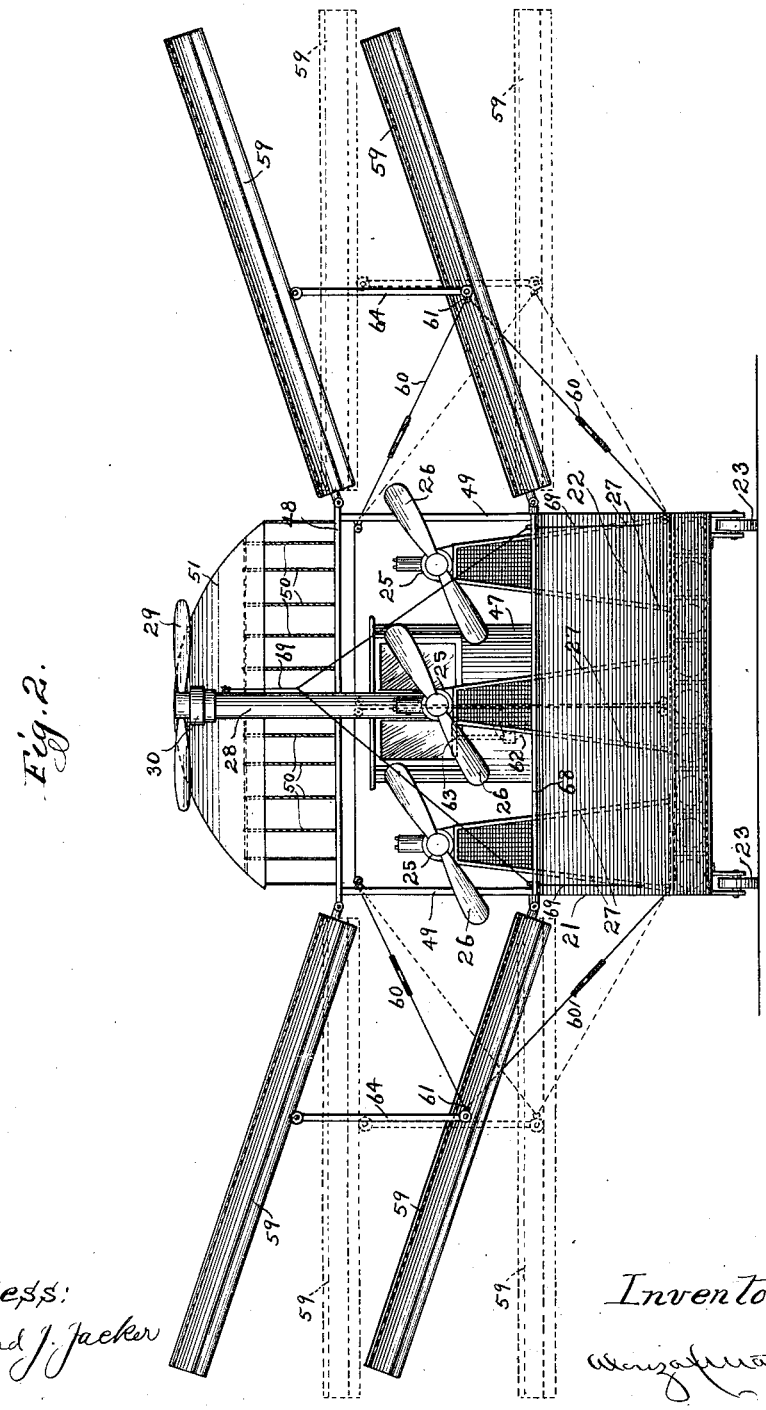

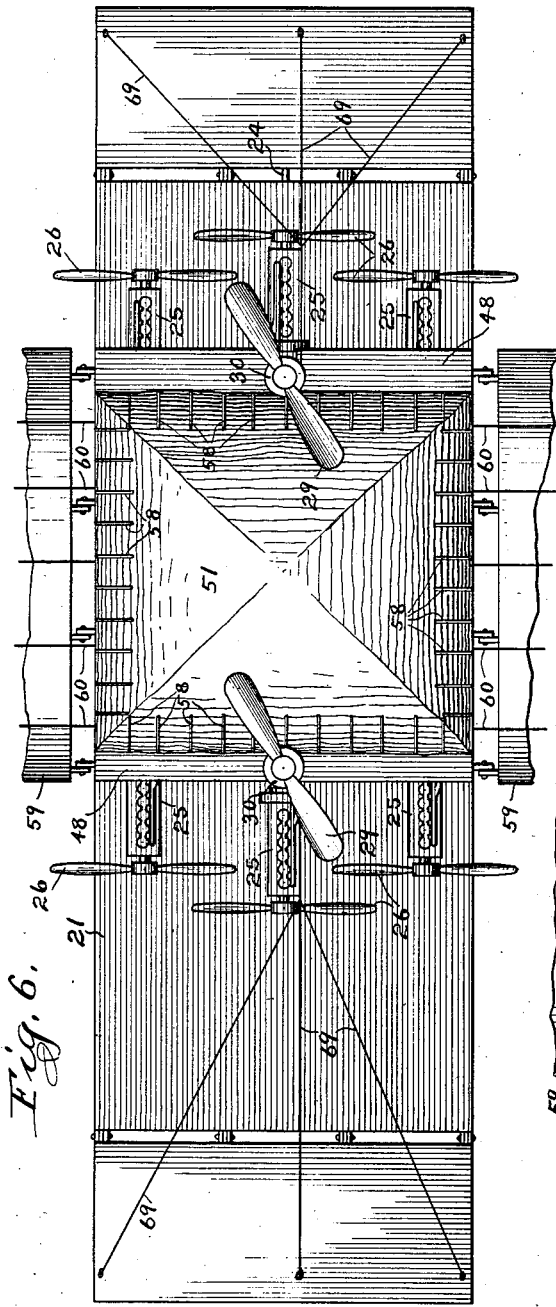
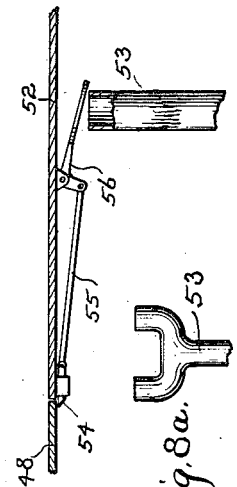
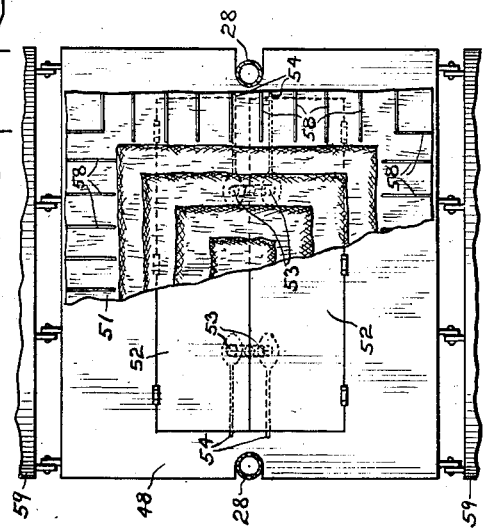

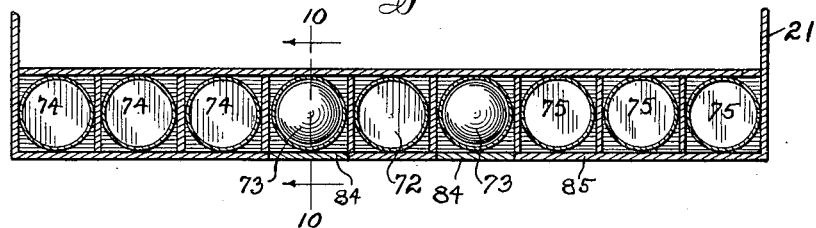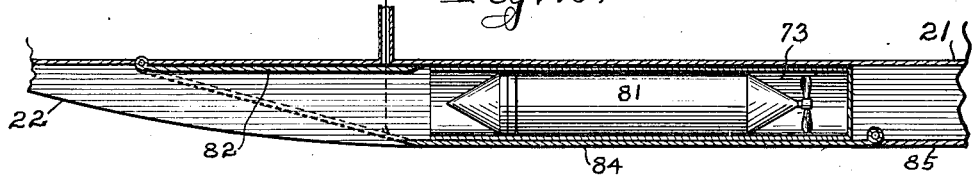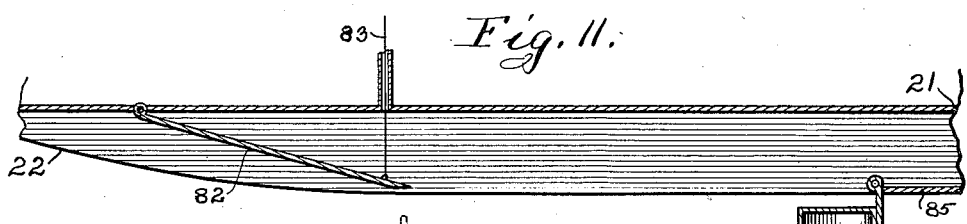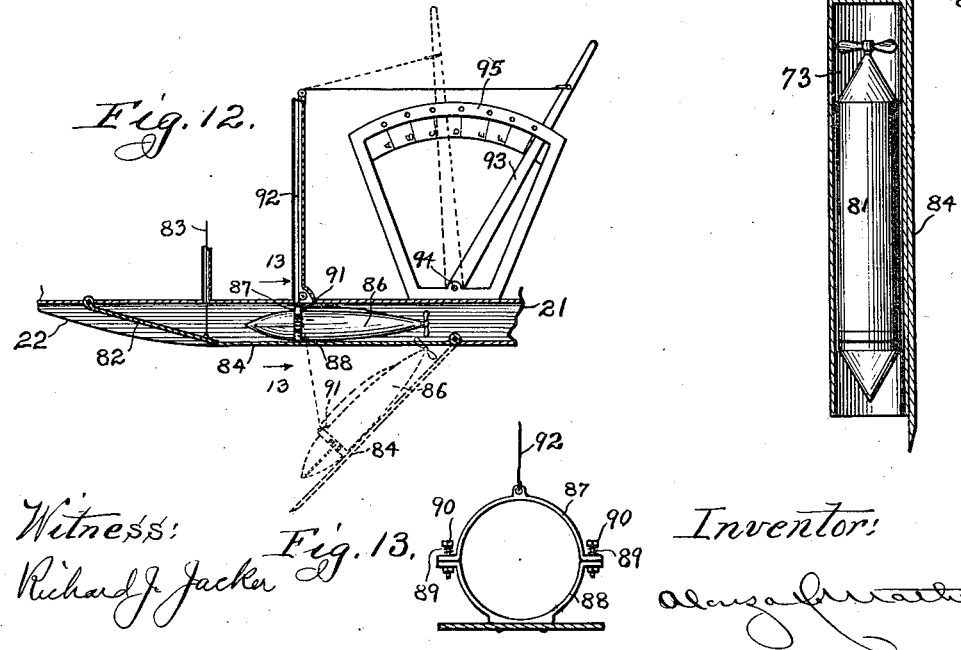

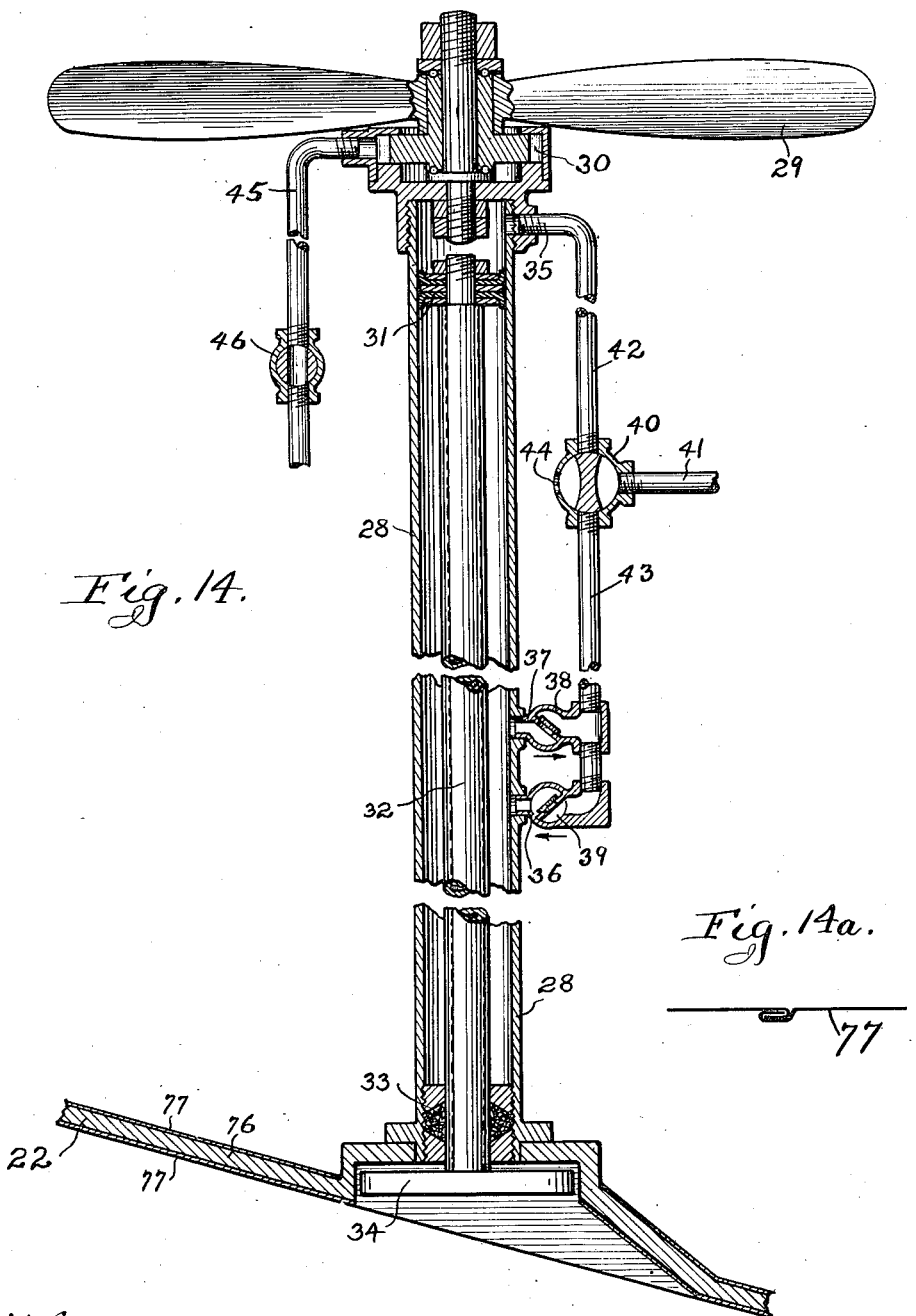

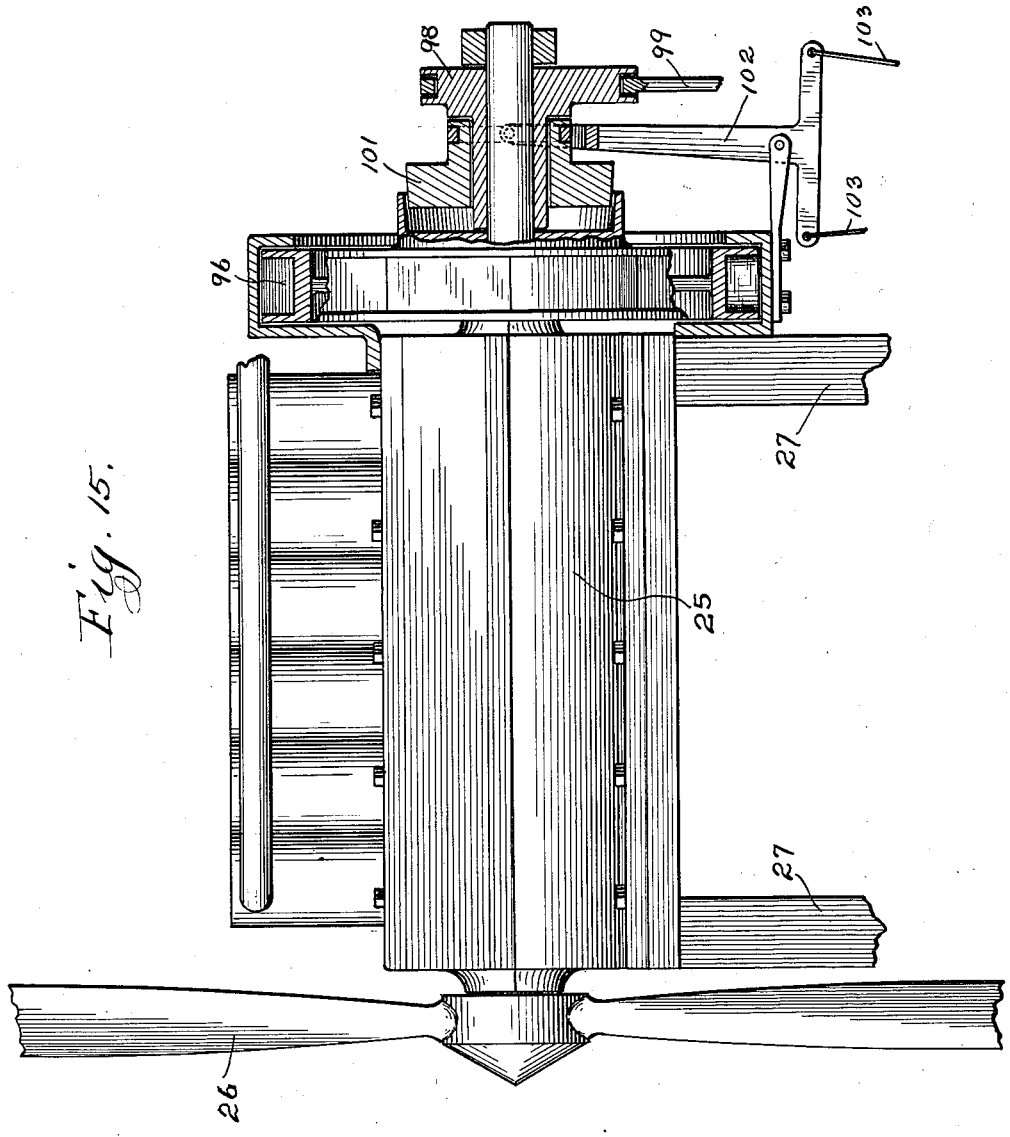

Patented July 16, 1929.

1,720,846

UNITED STATES PATENT OFFICE.

ALONZO C. MATHER, OF CHICAGO, ILLINOIS.

FLYING MACHINE.

Application filed April 18, 1921. Serial No. 462,185.

My invention relates to flying machines in which the body part is made in the form of a boat to enable the machine to float on water, and the objects of my improvements are: First, to provide a novel starting impulse mechanism; second, to provide the machine with a landing brake or parachute; third, to equip the machine with compressed air starters for its motors; fourth, to employ compressed air to open the parachute; fifth, to provide the machine with a novel torpedo launching mechanism; sixth, to provide means to raise the tip of the wings to give stability in landing and to keep them out of the water when riding at anchor; seventh, to make a safe, efficient, durable and well-balanced passenger carrying flying machine and, other features to become apparent from the description to follow.

In flying machines as heretofore constructed, the machine in starting must travel over several hundred feet of ground before rising above the same, which necessitates the use of a large level field; similarly when the machine makes a landing it travels over a considerable stretch of ground after contacting with the same and thus necessitates the use of a large level field; the motors on the machine were not provided with starters which endangered the lives of the attendants; the machines were more or less dangerous and no means was provided for launching torpedoes, either in the water or in the air. All these objectionable features are eliminated by the use of my invention which is provided with a starting mechanism which enables the machine to leave the ground in substantially a vertical direction; and also is provided with landing mechanism which enables the machine to alight in substantially a vertical path. My invention also embodies the provision of a plurality of air tanks which are constantly kept filled with compressed air which can be employed to start the machine in its flight, to force the gasolene to the motors, to open the parachute, and for various other purposes. Another novel feature of my invention is the torpedo launching mechanism.

To describe my invention so that others versed in the art to which it pertains can make and use the same, I have illustrated it on the accompanying seven sheets of drawings forming a part of this specification and in which:

Figure 1, is a side elevation of a flying machine embodying my invention; Figure 2 is a front elevation of the same; Figure 3 is a plan view of the deck of the boat body; Figure 4 is an enlarged plan section of the pilot house showing the mechanism therein; Figure 5 is an enlarged elevation of the air pressure gauge board; Figure 6 is a plan view of the machine shown in Figure 1, partly broken away; Figure 7 is a plan view of the upper deck partly broken away to show the arrangement of the air opening doors; Figure 8 is an enlarged detail view showing the air unlocking and door opening device; Fig. 8ª is an elevation of one of the parts shown in Fig. 8; Figure 9 is a cross sectional view of the bottom of the boat showing the arrangement of the tanks and torpedoes; Figure 10 and Figure 11 are longitudinal sectional views through the torpedo containers; Figure 12 is a similar view showing a modified form of torpedo launching mechanism; Figure 13 is an enlarged cross section taken on line 13—13 of Figure 12 with the torpedo omitted; Figure 14 is an enlarged detail sectional view through one of the starting impulse mechanisms; Figure 14ª is a detail section of the sheet metal on the hull, and Figure 15 is an enlarged side elevation of one of the motors partly broken away to expose the construction.

Similar reference characters refer to similar parts throughout the several views.

The body of the flying machine is made in the form of a boat 21 having a flat bottom which is curved up at the bow 22 so as to easily skim over the water and to serve as a plane when in flight, and is provided with the four wheels 23 which are suitably mounted in brackets secured to the bottom of the boat 21. The stern of the boat is provided with a rudder 24 in the usual manner. On the deck of the boat 21 are mounted six motors, 25, three fore and three aft, which are provided with propellers 26 to drive the machine forward at great speed. The motors 25 are preferably supported by suitable standards 27 which extend down to the braces in the bottom of boat 21. A pair of hollow masts or tubes 28 are provided on the boat 21 and extend from the bottom of the boat to some considerable distance above the deck where each is provided with a propeller 29 and a suitable air propelled turbine motor 30. The propellers 29 serve to lift the machine vertically, and to aid in giving the initial upward impulse to the machine I provide a piston 31, see Figure 14, in each tube 28, which is mounted on the upper end of a hollow piston rod 32, extending down through the stuffing box 33 and has the foot plate 34 secured to its exposed lower end.

To operate the piston 31 down and up in the tube 28 a fluid pressure pipe is connected to the top of the said tube at 35 and another pipe is connected to the lower part of tube 28 at 36. Obviously if a pressure fluid is admitted at 35, the piston 31 will be forced down in tube 28 and if a pressure fluid is admitted at 36, the piston 31 will be forced upward in tube 28. In order to cushion the downward movement of piston 31 at the end of its stroke, I provide a second inlet branch pipe 37 a short distance above the pipe 36, and provide said pipe with a check valve 38 arranged to permit pressure fluid to pass out of the tube 28 only, while the pipe 36 is provided with a check valve 39, arranged to permit pressure fluid to pass into the tube 28 only. Obviously when the piston 31 is moving rapidly down in tube 28, and when it passes the connection 37, its further downward movement will tend to compress the air between it and the stuffing box 33 within tube 28 because no air can escape past the check valve 39; and when pressure fluid is admitted through the pipe 36, the piston 31 will again be forced up to its normal position near the top of the tube 28.

A three-way valve 40 is provided within reach of the pilot and has the three pipes 41, 42, and 43 connected to it. The pipe 41 connects with the source of supply of the pressure fluid, the pipe 42 connects with the upper inlet 35 and the pipe 43 connects with the lower connections 36 and 37, as clearly seen in Figure 14. The position of valve 40 as shown in the drawing, is neutral and no pressure fluid is passing, therefore the piston 31 is locked against movement. When valve 40 is turned to permit pressure fluid to pass from the pipe 41 into pipe 42, the piston 31 will be forced down and the fluid from below the piston will be forced out through check valve 38, through pipe 43 and be exhausted through the opening 44 in valve 40. When valve 40 is turned to permit pressure fluid to pass from the pipe 41 into pipe 43 and through check valve 39, the piston 31 will be forced up in tube 28 and the fluid from above said piston will be forced out at 35 through pipe 42 and exhausted through opening 44 in valve 40. It will be understood of course, that there is only one valve 40 which controls the pressure to both the tubes 28, so that the pistons 31 in both tubes 28 always move in unison. As the pistons 31 are forced down, the foot plates 34 contact with the ground and thus the whole machine is lifted from the ground or deck of a ship.

As clearly seen in Figure 14, the motor 30 is attached to the upper end of tube 28 and serves to close the end of said tube. The pipe 45 which conducts pressure fluid from the source of supply to the motor 30 is provided with a valve 46 located within reach of the pilot so that the pilot can turn the power on propellers 29 at will. It will be understood that there is only one valve 46 which controls the pressure fluid to both motors 30.

Arranged in the center of the boat 21 and intermediate the two masts or tubes 28 is the pilot house 47, preferably built on the deck of the boat 21 and with its top some distance below the level of the upper deck 48. The upper deck 48 is substantially the same width as the boat 21 and is supported on and rigidly connected to the same by suitable struts 49 and the rods not shown.

Above the upper deck 48 and connected to it by a suitable means is arranged a parachute 51, which is normally folded down on top of the upper deck 48. When the machine is manipulated to land the parachute must be opened quickly and to accomplish the same, I provide a pair of trap doors 52 in the center of the upper deck 48, directly under the center of the parachute, which are normally locked in a closed position and are unlocked and blown open, upwardly, by a blast of pressure fluid directed to the same by means of two pipes 53. As seen in Figures 7 and 8, the doors 52 are hinged at their outer edges to have their free edges meet. The free edge of each door 52 is locked in its closed position by means of a latch 54 extending under the adjacent edge of the deck 48. A link 55 has one end connected to the latch 54 and its other end connected to the short arm of a bell crank lever 56 whose long arm is made wide and flat and is arranged to rest against the open upper end of the pipe 53. The parts are so arranged that when a blast of pressure fluid is emitted from the open end of pipe 53, the first action will be to swing the long arm of lever 56 upward and thus withdraw the latch 54 from under deck 48; and the further blast of pressure fluid upward from pipe 53 will swing the door 52 upward about its pivot which will also lift that portion of the parachute lying upon the door. After the door 52 is once opened, the natural upward draft of air through the door opening will open up the parachute and check the descent of the machine. It will be understood that only one valve 57 which is within reach of the pilot, is provided to control the supply of pressure fluid to both pipes 53, and when the valve 57 is opened, the pressure fluid exhausting will unlock the trap doors 52 and force them open and also raise and open up the parachute which normally is in a folded condition on top of the doors 52.

The parachute 51 is rectangular and its four edges are stiffened by securing thereto a series of light wooden strips 58 as shown in Figures 6 and 7.

Suitable upper and lower planes 59 are provided extending from each side of the body which are pivotally secured to the upper deck 48, and the main deck of the boat 21 respectively in such manner that they can be tilted about their horizontal pivots as shown in Figure 2. To hold the planes 59 in their adjusted position and also to adjust them as desired, a plurality of suitable lines or ropes 60 have their ends secured to the planes 59 at 61 and pass over suitable idler pulleys and thence make several turns around a winding drum 62 which is operated by a hand wheel 63 located in the pilot house 47, see Fig. 4. By viewing Figure 2, it will be seen that if the winding drum 62 is turned clockwise the planes 59 will be lifted up about their pivots, and if the winding drum 62 is turned contra-clockwise, the planes 59 will be pulled down about their pivots. The upper and lower planes on each side of the machine are connected by suitable struts 64 so that they both move in unison.

The rudder 24 is connected by suitable lines or ropes 65, see Figure 1, to a drum 66 which is operated by a hand wheel 67 in the pilot house 47, see Figure 4. Thus the rudder 24 may be turned to one side or the other by turning the hand wheel 67 in one direction or the other.

Suitable guiding planes or rudders 68 are provided at the front and rear of the boat 21 for the purpose of guiding the machine up or down in its course through the air, and are hinged to the boat to swing about horizontal pivots. Suitable operating lines or ropes 69 are secured to the free ends of the planes 68 and pass over a number of idlers and thence make several turns about the winding drum 70 which is operated by a hand wheel 71 in the pilot house 47, see Figures 1 and 4. The lines or cables 69 when passing through the hull of the boat below the water line are carried through pipes which extend above the water line within the boat. Obviously if the hand wheel 71 is turned in one direction the machine will be directed downward and if the said hand wheel is turned in the opposite direction, the machine will be directed upward in its course through the air. These guiding planes can also be elevated to better protect the bow and stern of the boat when in the water.

The horizontal compartment of the boat 21 is divided into a plurality of sections having suitable containers therein. In Figure 9, I have shown the center container 72 for lubricating oil; the adjacent two containers 73 for torpedoes; the three left hand containers 74 for compressed air tanks; and the three right hand containers 75 for gasoline or fuel. The hull of the boat 21 is preferably made of light wood 76, lined inside and out with tin, copper or other suitable sheet metal 77, as clearly shown in Figure 14, and in Figure 14ª, I have shown the manner of forming the sheet metal joints.

I prefer to have six separate compressed air tanks and in Figure 5 have shown six pressure gauges 78 which are mounted on a suitable gauge board 79 which is located in the pilot house 47. The compressed air furnished by the pumps to be described is forced into the first of the series of tanks. The first tank is connected to the second tank by a pipe provided with a safety valve; the second tank is connected to the third tank by a pipe provided with a safety valve and so on throughout the whole series of tanks. When the compressed air is used it is taken from the last tank of the series first, and as the pressure in said tank gets too low the pilot observes the corresponding gauge 78 and turns the proper valve 80 to use the compressed air from the next preceding tank and so on throughout the whole series of tanks.

In Figures 10 and 11, I have shown the manner of ejecting or launching the torpedo 81. Provision is made for either launching the torpedo under water or in the air. The torpedo 81 is stored in its compartment 73 which is provided at its front with a hinged door 82 arranged to be opened by a rod 83 from the interior of the boat 21 as shown in Figure 10. When the door 82 is thus opened the torpedo 81 is free to be ejected by the usual ejecting mechanism not shown. The compartment 73 is also provided with a door on the bottom which comprises a section 84 of the bottom 85 and is hinged to swing down to a vertical position as shown in Figure 11. The torpedo is secured in position on the door 84 and of course swings down with the door, where it can be ejected by the mechanism not shown, at the desired moment.

In Figures 12 and 13, I have shown a modified form of torpedo launching mechanism in which the torpedo 86 is held against moving forward by a spring pressed catch 87 in the form of a half collar or half circle which is held down toward the lower half collar or half circle shaped standard 88 by suitable springs 89 encircling the exposed ends of the bolts 90. The torpedo 86 is provided with a suitable lug 91 which rests against the rear side of the spring catch 87, and when a sufficiently strong pull is exerted on the rope 92 attached to catch 87, the torpedo is free to move forward and away from the boat 21. This mechanism is designed for dropping the torpedo by gravity and I have shown by dotted lines, the torpedo being launched on an angle of about 45 degrees. It will be understood that when the rope 92 is slackened the door 84 with the torpedo thereon, will swing down about its pivot and when the rope 92 is suddenly held from passing out, the spring catch 87 will be withdrawn from the path of the lug 91 on the torpedo, and the torpedo will pass on down by force of gravity. To thus operate the rope 92 and discharge the torpedo at any desired angle, I have shown a lever 93 which the rope 92 is attached to, arranged to swing about a pivot 94, and a segment 95 provided with a series of holes through which a pin can be passed to stop the movement of lever 93, so that the pilot, by knowing the distance from the side of a ship, the height of the air craft and the course which the torpedo takes when dropped at different angles, can calculate to an almost certainty where the torpedo will strike, even when at a high altitude and a safe distance from antiair craft guns.

The motors 25 as shown in Figure 15 are each provided with a combined starter and exhaust muffling turbine wheel 96, so that the motors can be started individually or collectively at will and the exhaust silenced if desired. To turn the engine over for the purpose of starting, compressed air from the tanks 74 is admitted to the turbine starter wheel 96 through pipes not shown, by opening the valve 97 which is located in the pilot house 47, see Figure 4. And to silence the exhaust it is diverted from the atmosphere pipe "a" to the turbine pipe "b", see Figure 3.

Two of the motors 25, preferably the two center ones, are provided with an eccentric 98 which operates a connecting rod 99 to operate the air pump 100, see Figure 1, which supplies the compressed air to the tanks at 74 in the bottom of the boat. When the air tanks are filled there is no need of operating the pumps 100, hence I provide a clutch 101 by means of which the operation of eccentric 98 can be turned off or on. The clutch shifting lever 102 is operated through the medium of suitable ropes or wires 103 by turning the handle 104 which is located in the pilot house, see Figure 4.

It will be understood that the size, shape and arrangement of the parts may be radically changed without in the least departing from the scope of my invention.

Having thus fully described my invention, what I claim as new and desire to secure by Letters Patent of the United States, is:

1. In a flying machine, a parachute carried in a folded condition on the upper plane and means for unfolding and opening up the parachute comprising a trap door in the upper plane underneath the parachute and means operable by compressed air for opening the door and unfolding the parachute.

2. In a flying machine a parachute carried in a folded condition on the upper plane and compressed air means located below the plane and acting through an opening in the plane for unfolding and opening said parachute, and means for controlling the compressed air.

3. In a parachute device for air-crafts, a door, a parachute, above the door, a latch for the door, compressed air means for operating said latch, and compressed air means for opening said doors.

4. In a flying machine, a parachute carried in a folded condition on the upper plane, and means for locating compressed air, below the plane and opening in the plane beneath the parachute, comprising a trap door in the upper plane underneath the parachute, a latch for said door, and means for releasing said latch by compressed air.

In testimony whereof I have signed my name to this specification this 16th day of March, 1921, at Chicago, Illinois.

ALONZO C. MATHER.